United States Patent [19]

O'Neil et al.

[11] 4,187,676
[45] Feb. 12, 1980

[54] BI-METALLIC THERMAL COMPENSATOR FOR MOUNTING A SOLID PROPELLANT GRAIN

[75] Inventors: Scott M. O'Neil, Ridgecrest, Calif.; Howard H. Payne, Las Vegas, Nev.

[73] Assignee: The United States of America as represented by the Secretary of the Navy, Washington, D.C.

[21] Appl. No.: 885,706

[22] Filed: Mar. 13, 1978

[51] Int. Cl.² .............................................. F02K 9/04
[52] U.S. Cl. ........................................ 60/255; 102/99
[58] Field of Search ................. 60/255, 39.47; 102/99, 102/102; 428/616, 617, 618, 619

[56] References Cited

U.S. PATENT DOCUMENTS

| | | | |
|---|---|---|---|
| 1,852,543 | 4/1932 | Spencer | 428/619 |
| 2,937,493 | 5/1960 | Adelman | 60/255 |
| 3,066,481 | 12/1962 | George et al. | 60/255 |
| 3,144,829 | 8/1964 | Fox | 60/255 |
| 3,201,936 | 8/1965 | Bancelin | 60/255 |
| 3,238,717 | 3/1966 | Aycock et al. | 60/255 |
| 3,327,481 | 6/1967 | Horvath | 60/255 |
| 3,765,846 | 10/1973 | Gottueb et al. | 428/616 |
| 3,786,633 | 1/1974 | Worcester et al. | 60/255 |
| 3,916,618 | 11/1975 | Araki et al. | 60/255 |

*Primary Examiner*—Robert E. Garrett
*Attorney, Agent, or Firm*—R. S. Sciascia; W. Thom Skeer

[57] ABSTRACT

A rocket assisted projectile is equipped with a bi-metallic disk which changes shape to compensate for propellant grain growth or shrinkage with change in ambient temperature for maintaining the propellant in a predetermined position within the combustion chamber of the rocket. The disk is located in the combustion chamber forward of the propellant grain and bears against the chamber forward wall and the forward end of the grain. The effective thickness of the disk increases with reduced temperature so that the grain is maintained in solid contact with the base of the projectile to prevent excessive energy absorption upon firing of the projectile.

4 Claims, 3 Drawing Figures

BI-METALLIC THERMAL COMPENSATOR FOR MOUNTING A SOLID PROPELLANT GRAIN

BACKGROUND OF THE INVENTION

1. Field of the Invention

The present invention pertains to an improvement in rocket assisted projectiles, and, more particularly, to a temperature responsive means for maintaining the propellant grain in a projectile in contact with the projectile base.

2. Description of the Prior Art

Prior means for maintaining the solid fuel grain in contact with the base of a projectile have employed resilient springs or washers which are not temperature responsive and which, therefore, maintain the grain under compression at all times.

SUMMARY OF THE INVENTION

The present invention overcomes this limitation in the prior art by providing a bi-metallic disk which is responsive to temperature. It effectively increases its thickness as the propellant grain shrinks due to lowering in temperature, and reduces its thickness as the propellant grain grows in length because of a rise in temperature. The bi-metallic compensator, which may be a disk or other shape depending upon the rocket grain configuration, is comprised of at least two separate alloys wherein each alloy has a different coefficient of thermal expansion. The two alloys are joined at a predetermined temperature in the flat condition. As the temperature changes from that predetermined condition, the compensator is distorted by thermally induced stresses owing to the different coefficients of thermal expansion. In this manner the present invention changes shape with change in temperature and, thereby, compensates for length gained or lost by a thermally affected propellant grain.

BRIEF DESCRIPTION OF THE DRAWING

Further advantages of the present invention will emerge from the discription which follows of the preferred embodiment of a bi-metallic thermal compensator according to the invention, given with reference to the accompanying drawing figures, in which.

DESCRIPTION OF THE PREFERRED EMBODIMENT

Figure 1:
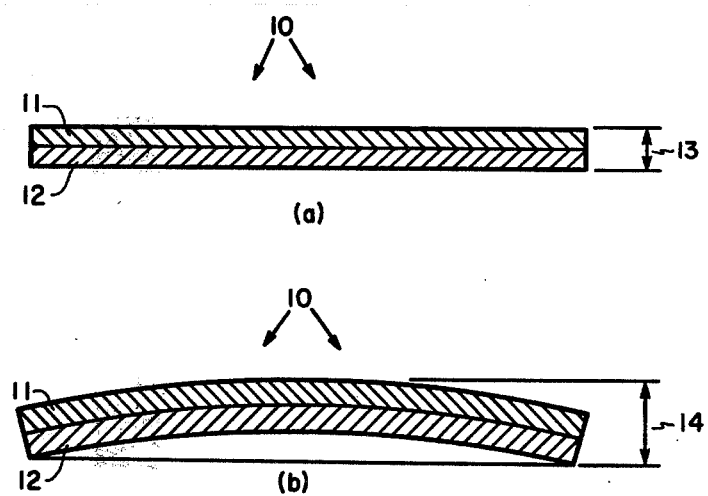
FIG. 1 illustrates sectional side views of a bi-metallic thermal compensator according to the invention.

Referring now to the drawings wherein like reference numerals correspond to like parts and elements throughout the several views, there is shown in FIG. 1 a side view of a bi-metallic thermal compensator 10. Compensator 10 has first metallic layer 11 and second metallic layer 12. The alloy selected for use in layer 11 must have a different coefficient of thermal expansion than does the alloy selected for use in layer 12 as is commonly known in the bi-metallic arts.

The present invention advantageously uses an alloy comprising 72% manganese, 18% copper, and 10% nickel by weight to form the high expansion side which is layer 12. This layer makes up approximately 55% of the total disk thickness. Layer 11 is made of an alloy of 36% nickel and 64% iron by weight to form the low expansion side. Chase 6650 alloy is one commercial alloy which functions satisfactorily in the present invention, but any similar alloy may be used. Layer thickness may be adjusted depending upon alloy selected and known design principles for bimetallic structures. Chase 6650 alloy is a product of Chase Thermostatic Metals/Precision Materials Group, 1614 Beard Avenue, Detroit Michigan.

Figure 3:
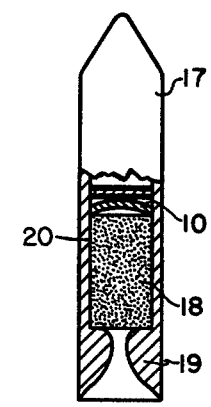
FIG. 3 illustrates the bi-metallic thermal compensator installed in a rocket assisted projectile.

As can be seen in FIG. 1, a compensator 10 assumes a flat configuration, and its thickness is measured at dimension 13. As the ambient temperature decreases, layer 12, having a greater coefficient of thermal expansion than does layer 11, assumes the concave portion of the dome configuration shown in FIG. 1b. Dimension 14 has now increased over prior dimension 13. FIG. 3 shows compensator 10 mounted in the front of a rocket motor combustion chamber 20. Grain 18 as shown in FIG. 3 has shrunk in length because of the reduced temperature; and the increase in dimension 14 over dimension 13 is designed to accomodate the lost length of propellant grain 18, thereby maintaining propellant grain 18 in contact with base 19.

Figure 2:
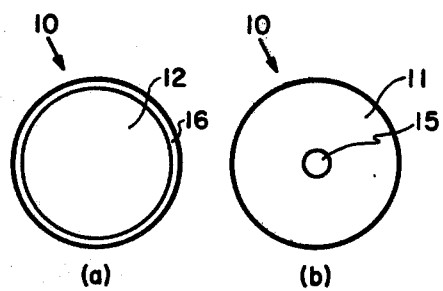
FIG. 2 illustrates the zones of contact on the respective sides of a bi-metallic thermal compensator according to the invention.

Referring now to FIG. 2, there is shown the zones of contact of thermal compensator 10 on opposite sides. On the side defined by layer 12, shown in FIG. 2a, the zone of contact 16 is shown as a peripheral band of contact between layer 12 and a flat surface which maybe either rocket 17 structure or propellant grain 18. FIG. 2b illustrates zone of contact 15 in the center of layer 11. Thermal compensator 10 may be installed to bear against the structure of rocket 17 at zone of contact 15; or by reversing the position of compensator 10, zone of contact 16 may bear against the structure of rocket 17. It is considered good practice to place a force-distributing surface such as a metal plate on top of grain 18 to distribute forces from bi-metallic thermal compensator 10, although this is not absolutely required.

An important feature of the present invention is the fact that the temperature responsive compensator does not place grain 18 under continual compressive stress. As temperature changes, compensator 10 changes its effective thickness dimension inversely to the length of grain 18. This enables compensator 10 to maintain grain 18 in solid contact with base 19 of combustion chamber 20 of rocket 17 without the need for continual compressive stress.

In general, propellant grains are designed to withstand a temperature variation within the range of from $-40°$ F. to $+140°$ F. Thermal expansion of grain 18 within this range can be as much as 0.4 inches in length. The present invention is used to minimize absorption of energy at launch when the grain, if loose within the chamber, may be be impact loaded by the base of the rocket as the projectile is fired. The high thermal expansion rate of the propellant grain and the need to apply an inhibiting layer to the exterior surface of the propellant grain, as is well known in the art, precludes the possibility of rigidly bonding the grain to the projectile wall within the combustion chamber. Thus, depending upon the ambient temperature, the propellant grain may or may not occupy the entire projectile cavity and may or may not rest on the base of the projectile.

The present invention in the configuration of a disk is manufactured to be flat at approximately $+140°$ F. As the temperature falls below 140° and the propellant grain becomes shorter than the available space it occupies, thermally induced stresses cause the disk to assume a dome-like configuration, bearing against the propellant grain on one side and the projectile propellant cavity on the other. As the temperature falls and the grain shortens, the disk forms an even smaller radius dome segment which occupies the space between the grain and the forward end of the propellant cavity. If the space occurs at the opposite end of the grain as the grain shortens, the bi-metal dome develops sufficient force to move the grain into contact on the opposite end with the base of the projectile.

Obviously many modifications and variations of the present invention are possible in light of the above teachings. It is, therefore, to be understood that within the scope of the appended claims the invention may be practiced otherwise than as specifically described. For example, a plurality of bimetallic disks may be stacked in series or arranged in parallel configurations, which may also include separate stacks, in order to achieve desired thickness or force characteristics at preselected temperatures. Also a disk may be preformed to a specified curvature during assembly in order to achieve a desired configuration at a preselected temperature.

What is claimed is:

1. A thermally responsive bi-metallic compensator for stabilizing the position of free-floating solid propellant grain in a rocket motor combustion chamber, comprising:
   a first metallic layer having a first predetermined coefficient of thermal expansion; and
   a second metallic layer having a second predetermined coefficient of thermal expansion, said second metallic layer joined to said first metallic layer to form a thermally responsive bi-metallic structure, said thermally responsive bi-metallic structure mounted in the front end of said rocket motor combustion chamber.

2. A thermally responsive bi-metallic compensator as set forth in claim 1 wherein said first and second metallic layers are configured to form a disk.

3. A thermally responsive bi-metallic compensator as set forth in claim 1 wherein said first layer has a thickness equal to approximately 55% of the combined thicknesses of said first and second layers.

4. A thermally responsive bi-metallic compensator as set forth in claim 1 wherein said first predetermined coefficient of thermal expansion is greater than said second predetermined coefficient of thermal expansion.

* * * * *